United States Patent
Luo

(10) Patent No.: US 7,693,326 B1
(45) Date of Patent: Apr. 6, 2010

(54) METHOD AND SYSTEM FOR IMPLEMENTING A LOW-COMPLEXITY SCHEME IN COLOR CONVERSION AND DOWN-SAMPLING OF IMAGE CODECS

(75) Inventor: Fa-Long Luo, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1958 days.

(21) Appl. No.: 10/263,941

(22) Filed: Oct. 2, 2002

(51) Int. Cl.
*G06K 9/00* (2006.01)
*G06K 9/32* (2006.01)

(52) U.S. Cl. ...................................... 382/162; 382/199
(58) Field of Classification Search ................. 382/162, 382/992
See application file for complete search history.

(56) References Cited

U.S. PATENT DOCUMENTS

| | | | | |
|---|---|---|---|---|
| 5,990,876 A | * | 11/1999 | Shyu | 345/603 |
| 6,392,699 B1 | * | 5/2002 | Acharya | 348/273 |
| 7,002,627 B1 | * | 2/2006 | Raffy et al. | 348/273 |
| 2002/0101524 A1 | * | 8/2002 | Acharya | 348/273 |

OTHER PUBLICATIONS

Molloy, Stephen Arthur. "Low Complexity, Low Power VLSI Architectures for Image CODECs," a dissertation submitted in partial satisfaction of the requirements for the degree Doctor of Philosophy in Electrical Engineering, university of California, Los Angeles, 1997. 223 pages.

Madhukar, Budagavi, et al., "Wireless MPEG-4 Video Communication on DSP Chips," IEEE Signal Processing Magazine, Jan. 2000, pp. 38-53.

* cited by examiner

*Primary Examiner*—Wenpeng Chen
(74) *Attorney, Agent, or Firm*—Patterson & Sheridan, LLP

(57) ABSTRACT

An image processing method and system using a low-complexity scheme is provided. According to one aspect of the method, input components from a RGB model are used directly to calculate the down-sampled components of a YCbCr model. In an exemplary instance where average down-sampling and a down-sampling rate of "4:2:0" are used, the following equations are used to derive the down-sampled components of the YCbCr model:

$$Y_i'' = 0.29900 R_i + 0.58700 G_i + 0.11400 B_i$$

$$Cb'' = -0.04219 \sum_{i=0}^{3} R_i - 0.082815 \sum_{i=0}^{3} G_i + 0.12500 \sum_{i=0}^{3} B_i + 2^{SP/2}$$

$$Cr'' = 0.12500 \sum_{i=0}^{3} R_i - 0.10467 \sum_{i=0}^{3} G_i - 0.02033 \sum_{i=0}^{3} B_i + 2^{SP/2}$$

where $R_i$, $G_i$ and $B_i$ are three input components of the color conversion for the pixel i and "SP" represents a specified sample precision under the RGB model. The foregoing method reduces computational complexity and cost thereby allowing an image color conversion process to be performed in a more efficient manner.

18 Claims, 1 Drawing Sheet

METHOD AND SYSTEM FOR IMPLEMENTING A LOW-COMPLEXITY SCHEME IN COLOR CONVERSION AND DOWN-SAMPLING OF IMAGE CODECS

BACKGROUND OF THE INVENTION

The present invention generally relates to image processing. More specifically, the present invention relates to an image processing method and system using a low-complexity scheme.

FIG. 1 is a simplified block diagram illustrating a typical image color conversion process. It is typical for image codecs, such as those using the JPEG and MPEG formats, to perform color conversion from the red-green-blue (RGB) model to the YCbCr model, where Y is the luminance component, Cb is the chrominance component for blueness and Cr is the chrominance component for redness. In addition, in order to achieve data reduction, a down-sampling process is performed according to the visual perception of the image being processed. For different components, different down-sampling frequencies may be used. Down-sampling can also be made both vertically and horizontally. As a result, various combinations of down-sampled image data can be obtained for additional processing.

One rate that is commonly used for down-sampling is "4:2:0", which means that no down-sampling is performed on the Y component and "2:1" vertical and horizontal down-sampling is performed for the Cb component and the Cr component. With the "4:2:0" down-sampling rate, a fifty percent (50%) data reduction can be achieved.

From a computational complexity perspective, however, the color conversion and down-sampling processes are very expensive. That is, a large number of computations are typically needed to process the desired image data. For example, as will be further illustrated below, with a down-sampling rate of "4:2:0" and average processing taken into account, thirteen (13) multiplications and fifteen (15) additions are required to get a down-sampled Cb or Cr component from corresponding RGB formats.

FIG. 2 is a simplified diagram illustrating a down-sampling rate of "4:2:0". Equations for RGB to YCbCr conversion can be roughly expressed as:

$Y = 0.29900R + 0.58700G + 0.11400B$ $Cb = -0.16874R - 0.33126G + 0.50000B + 2^{SP/2}$ $Cr = 0.50000R - 0.41869G - 0.08131B + 2^{SP/2}$ Eqs. (1)

where "SP" stands for sample precision. Let $Y_0', Y_1', Y_2', Y_3'$ and $Y_0'', Y_1'', Y_2'', Y_3''$ denote the Y component before and after down-sampling, respectively. Likewise, let $Cb_0', Cb_1', Cb_2', Cb_3'$ and $Cb''$ denote the Cb component and $Cr_0', Cr_1', Cr_2', Cr_3'$ and $Cr''$ denote the Cr component, before and after down-sampling, respectively. According to the above definition, for average down-sampling, the following represents equations that can be used to obtain the Y, Cb and Cr components under the YCbCr model:

$$Y_i'' = Y_i'$$ Eqs. (2)

$$Cb'' = \frac{1}{4}(Cb_0' + Cb_1' + Cb_2' + Cb_3') \text{ (for } i = 0, 1, 2, 3)$$

$$Cr'' = \frac{1}{4}(Cr_0' + Cr_1' + Cr_2' + Cr_3')$$

Referring to Eqs. (1), to convert each RGB pixel to obtain $Cb_i'$ before down-sampling, three (3) multiplications and three (3) additions are needed, that is, one (1) multiplication each for each RGB component and three (3) additions to sum up the result. Likewise, the same number of multiplications and additions are needed to obtain $Cr_i'$ before down-sampling.

Referring to Eqs. (2), to obtain Cb" after down-sampling from RGB, fifteen (15) (3×4+3=15) additions and thirteen (13) (3×4+1=13) multiplications are needed. Likewise, the same number of multiplications and additions are needed to obtain Cr" after down-sampling.

From a computational complexity perspective, the computational cost to carry out the foregoing becomes very expensive as the number of pixels and the number of bits representing each pixel increase. For each pixel to be converted from the RGB model to the YCbCr model, thirteen (13) multiplications and fifteen (15) additions are required in order to obtain a down-sampled Cb" or Cr" component.

It should be noted that the foregoing example is given merely for illustrative purposes. In order to calculate the down-sampled Cb" and Cr" components, more generalized equations can be used as follows:

$Cb'' = \alpha_0 Cb_0' + \alpha_1 Cb_1' + \alpha_2 Cb_2' + \alpha_3 Cb_3'$ $Cr'' = \beta_0 Cr_0' + \beta_1 Cr_1' + \beta_2 Cr_2' = \beta_3 Cr_3'$ Eqs. (3)

Note that Eqs. (2) above are merely specific instances of Eqs. (3) where $\alpha_i$ and $\beta i$ are one-quarter (¼), where i=0, 1, 2, 3. Similarly, using Eqs. (1) and (3), it can be seen that in order to calculate the down-sampled Cb", sixteen (16) multiplications and fifteen (15) additions are needed; and the down-sampled Cr" need the same number of multiplications and additions.

One simple way to reduce this computational complexity is to re-use the value of a pixel for a predetermined number of adjacent, contiguous pixels. In other words, a predetermined number of pixels are skipped and are assumed to have the same values. The drawback of this approach is that it produces serious block effects which compromise the quality of the processed image. Moreover, in order to reduce block effects, filtering processing may need to be performed which adds to the computational costs.

Hence, it would be desirable to provide a method and system that is capable of producing a relatively high image quality at reduced computational costs.

SUMMARY OF THE INVENTION

An image processing method and system using a low-complexity scheme is provided. According to one exemplary aspect of the method, input components from a RGB model are used directly to calculate the down-sampled components of a YCbCr model. For a general case, the down-sampled components of the YCbCr model are derived using the following equations:

$Y_i' = 0.29900R_i + 0.58700G_i + 0.11400B_i$ $Cb_i' = -0.16874R_i - 0.33126G_i + 0.50000B_i + 2^{SP/2}$ $Cr_i' = 0.50000R_i - 0.41869G_i - 0.08131B_i + 2^{SP/2}$ where $R_i$, $G_i$ and $B_i$ are three input components of the color conversion for the pixel i under the RGB model.

In an exemplary instance where average down-sampling and a down-sampling rate of "4:2:0" are used, the following equations (derived from the equations above) are used to obtain the Y, Cb and Cr components under the YCbCr model:

$$Y_i'' = 0.29900 R_i + 0.58700 G_i + 0.11400 B_i$$

$$Cb'' = -0.04219 \sum_{i=0}^{3} R_i - 0.082815 \sum_{i=0}^{3} G_i + 0.12500 \sum_{i=0}^{3} B_i + 2^{SP/2}$$

$$Cr'' = 0.12500 \sum_{i=0}^{3} R_i - 0.10467 \sum_{i=0}^{3} G_i - 0.02033 \sum_{i=0}^{3} B_i + 2^{SP/2}$$

The present invention provides a number of benefits and advantages. For example, as will be illustrated below, computational cost and complexity associated with image processing may be significantly reduced. Consequently, by reducing computational cost and complexity, the speed or rate of image processing can also be improved.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

The present invention in the form of one or more exemplary embodiments will now be described. The present invention proposes a method and system that can significantly reduce the computational complexity needed for the color conversion and down-sampling stages of image coder/decoders (codecs).

Figure 1:
FIG. 1 is a simplified block diagram illustrating a typical image color conversion process and down-sampling.
Figure 2:
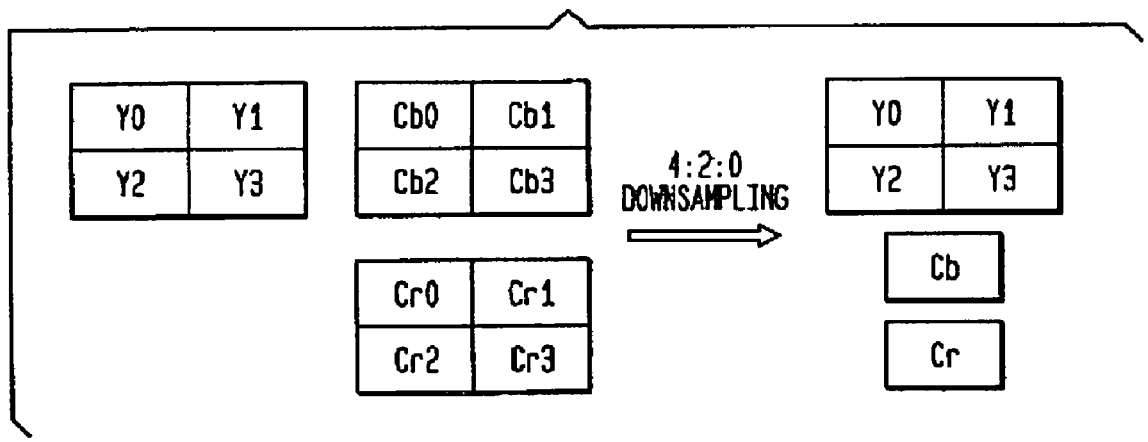
FIG. 2 is a simplified diagram illustrating a down-sampling rate of "4:2:0"
Figure 3:
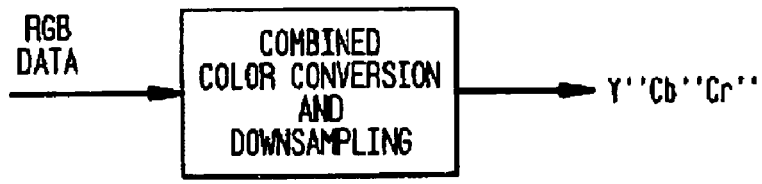
FIG. 3 is a simplified block diagram illustrating an exemplary embodiment of the present invention.

According to an exemplary method of the present invention, as shown in FIG. 3, the input components from the RGB model are used directly to calculate the down-sampled components of the YCbCr model.

Using the exemplary method, for average down-sampling, the following equations are used to obtain the Y, Cb and Cr components under the YCbCr model:

$$Y_i'' = 0.29900 R_i + 0.58700 G_i + 0.11400 B_i \qquad \text{Eqs. (4)}$$

$$Cb'' = -0.04219 \sum_{i=0}^{3} R_i - 0.082815 \sum_{i=0}^{3} G_i + 0.12500 \sum_{i=0}^{3} B_i + 2^{SP/2}$$

$$Cr'' = 0.12500 \sum_{i=0}^{3} R_i - 0.10467 \sum_{i=0}^{3} G_i - 0.02033 \sum_{i=0}^{3} B_i + 2^{SP/2}$$

where $R_i$, $G_i$ and $B_i$ are three input components of the color conversion for the pixel i under the RGB model.

Eqs. (4) are used to calculate the same three down-sampled components as those provided by Eqs. (2) above. As will be further illustrated below, with Eqs. (4), the number of computations (i.e., number of multiplications and additions) needed to calculate Cb" is reduced from twenty-eight (28) (13+15) to fifteen (15) and the number of computations needed to calculate Cr" is reduced from twenty-eight (28) to six (6), when compared to Eqs. (2) above. It should be noted that from a computational perspective, a subtraction is equivalent to an addition.

With respect to Eqs. (4), the number of computations needed to calculate Cb" is determined as follows. For each of the summation of an input component ($R_i$, $G_i$ or $B_i$), three (3) additions are performed, thereby resulting in nine (9) additions for all three input components. Next, three (3) multiplications are performed to multiply the summation results with their respective coefficients. Then, three (3) more additions are performed to sum up the result for Cb". Therefore, the total number of additions and multiplications are twelve (12) and three (3), respectively, resulting in fifteen (15) total computations.

The number of computations needed to calculate Cr" is determined as follows. Similarly, the summation of each input component is obtained. It is noted that at this point the summation results are readily available. These results have already been calculated when deriving Cb". This same computational saving is achieved when the order of calculation of Cb" and Cr" is reversed. Likewise, three (3) multiplications are performed to multiply the summation results with their respective coefficients. Then, three (3) more additions are performed to sum up the result representing Cb". Therefore, the total number of additions and multiplications are three (3) and three (3), respectively, resulting in six (6) total computations.

As previously noted in connection with Eqs. (2), the total computational cost for calculating Cb" and Cr" is fifty-six (56), i.e., fifteen (15) additions and thirteen (13) multiplications each. In contrast, under the above exemplary method, the total computational cost for calculating Cb" and Cr" is twenty-one (21), i.e., three (3) multiplications and twelve (12) additions for Cb" and three (3) multiplications and three (3) additions for Cr", or vice versa. The foregoing computational saving as illustrated above is achieved on a per pixel group basis. As the number of pixels that need to be processed increases, the computational saving correspondingly increases as well.

It should be noted that the results obtained above with respect to Eqs. (4) are based on an input pixel group size of four (4), i.e., i=(0, 1, 2, 3). Data from the corresponding pixels in each input pixel group is down-sampled to generate the corresponding Yi", Cb" and Cr" components. There are four (4) corresponding constituents for each input component, $R_i$, $G_i$ and $B_i$ (i=0, 1, 2, 3), that are used to calculate every Cb" and Cr". It should be understood that the size of the input pixel group may vary depending on the specific design and/or constraints of a particular application. For example, the size of the input pixel group may be eight (8), sixteen (16) or thirty-two (32), etc. A person of ordinary skill in the art will know how to determine the appropriate size for the input pixel group.

Furthermore, the respective coefficients used to calculate Cb" and Cr" are determined on an empirical basis. It should be understood that these coefficients do not have to be precise. Substantially similar coefficients may be used depending on the conversion accuracy desired. Based on the disclosure provided herein, a person of ordinary skill in the art will know how to determine and select the appropriate coefficients.

Moreover, Eqs. (4) can be generalized to accommodate the general case as shown below and in Eqs. (3) (as opposed to simple average down-sampling).

$$Cb'' = \sum_{i=0}^{3} -0.168474\alpha_i R_i + \sum_{i=0}^{3} -0.33126\alpha_i G_i +$$

$$\sum_{i=0}^{3} 0.5\alpha_1 B_1 + \sum_{i=0}^{3} \alpha_i 2^{SP/2}$$

$$Cr'' = \sum_{i=0}^{3} 0.5\beta_i R_i + \sum_{i=0}^{3} -0.41869\beta_i G_i +$$

$$\sum_{i=0}^{3} -0.08131\beta_i B_i + \sum_{i=0}^{3} \beta_i 2^{SP/2}$$

Eqs. (5)

According to Eqs. (5), Cb" is the weighted summation of all $Cb_i'$. With simple arithmetic manipulations, it can be seen that, for Eqs. (5), the number of computations that are needed to obtain Cb" is twenty-four (24), i.e., twelve (12) multiplications and twelve (12) additions. The foregoing is obtained by expanding out Cb" and treating the constants "$2^{sp/2}$" in the four (4) $Cb_i'$ collectively as one single constant. Likewise, the same number of computations are needed to obtain Cr" under Eqs. (5). In contrast, as mentioned above in connection with Eqs. (3), the number of computations needed to calculate Cb" or Cr" are thirty-one (31) (fifteen (15) additions and sixteen (16) multiplications).

Similarly, as described above, the input pixel group size may vary depending on the specific design and/or constraints of a particular application. With respect to Eqs. (5) above, the input pixel group size is also four (4), i.e., i=(0, 1, 2, 3). Likewise, the respective coefficients used to calculate each $Cb_i'$ and $Cr_i'$ are determined on an empirical basis. Again, substantially similar coefficients may be used depending on the conversion accuracy desired and a person of ordinary skill in the art will know how to determine and select the appropriate coefficients.

It should be noted that the present invention as described above could be generalized and applied to other FIR filtering algorithms. The reduction of complexity may vary depending on the specific filtering algorithm involved.

It should be understood that the present invention can be implemented using software, hardware or a combination of both. For example, an exemplary method of the present invention may be implemented in the form of control logic or modules, in an integrated or modular manner, using software or hardware. In another example, an exemplary method of the present invention may be implemented using hardware such as circuits and logic gates. Based on the disclosure provided herein, a person of ordinary skill in the art will know of the various ways and/or methods to implement the present invention.

Furthermore, it should be understood that the present invention can be employed in many different types of applications. For example, the present invention can be employed in a codec or microprocessor for image processing in an image processing or computer system. Based on the disclosure provided herein, a person of ordinary skill in the art will know of the various ways and/or methods to employ or incorporate the present invention in different types of applications.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A computer-implemented method for converting image data from a RGB model to a YCbCr model, wherein average down-sampling is used to convert the data, the method comprising the steps of:

receiving data that represents a plurality of input components of an image that includes a red component, a green component and a blue component, wherein the plurality of input components are in a format compatible with the RGB model and each of the plurality of input components has a plurality of sub-components;

summing up the plurality of sub-components for each of the plurality of input components;

multiplying the respective sums of the red component, the green component and the blue component with a first set of corresponding coefficients, which are equal to −0.04219, −0.082815 and 0.12500, respectively, to obtain a first set of three resulting products;

summing up the first set of three resulting products and a constant to obtain a representation for a chrominance component for blueness, the representation for a chrominance component for blueness being in a format compatible with the YCbCr model, wherein the chrominance component for blueness is determined by fifteen computations, and each computation is either a multiplication or an addition computation;

multiplying, by an image processing microprocessor or codec, the respective sums of the red component, the green component, and the blue component with a second set of corresponding coefficients, which are equal to 0.12500, −0.10467 and −0.02033 respectively, to obtain a second set of three resulting products;

summing up the second set of three resulting products and the constant to obtain a representation for the chrominance component for redness, the representation for the chrominance component for redness being in a format compatible with the YCbCr model, wherein the chrominance component for redness is determined by six computations, and each computation is either a multiplication or an addition computation, and wherein the microprocessor for image processing is configured to perform the steps of receiving data, summing up the plurality of sub-components, multiplying the respective sums of the red component, the green component and the blue component with a first set of corresponding coefficients, summing up the first set of three resulting products, multiplying the respective sums of the red component, the green component and the blue component with a second set of corresponding coefficients, and summing up the second set of three resulting products.

2. The method of claim 1 wherein the steps recited in claim 1 are performed on every pixel of at least a portion of an RGB image.

3. The method of claim 1 wherein the method is implemented using hardware circuits that include logic gates.

4. A computer-implemented method for calculating a first down-sampled component and a second down-sampled component under the YCbCr model, the method comprising:

receiving a plurality of input components including a first input component, a second input component and a third input component, wherein the plurality of input components are in a format compatible with a RGB model and each of the plurality of input components has a plurality of sub-components for every pixel in an input pixel group, wherein a microprocessor for image processing is configured to perform the steps of receiving a plurality of input components; and calculating, by the microprocessor for image processing, the first down-sampled component and the second down-sampled component using the following equations:

$$Cb'' = \sum_{i=0}^{n} J_i R_i + \sum_{i=0}^{n} K_i G_i + \sum_{i=0}^{n} L_i B_i + Mb$$

$$Cr'' = \sum_{i=0}^{n} N_i R_i + \sum_{i=0}^{n} O_i G_i + \sum_{i=0}^{n} P_i B_i + Mr$$

where

Cb" represents the first down-sampled component;

Cr" represents the second down-sampled component;

$R_i$ represents a red sub-component of the first input component;

$G_i$ represents a green sub-component of the second input component;

$B_i$ represents a blue sub-component of the second input component;

$J_i$=−0.04219; $K_i$=−0.082815; $L_i$=0.12500; $N_i$=0.12500; $O_i$=−0.10467; $K_i$=−0.02033 and, Mb and Mr represent respective constant coefficients, and i=(0, 1, n), with n being the size of the input pixel group wherein n=3 and Cb" is determined by fifteen computations and Cr" is determined by six computations, wherein each computation is one of a multiplication or an addition.

5. The method of claim 4 wherein the first down-sampled component represents a chrominance component for blueness under the YCbCr model and the second down-sampled component represents a chrominance component for redness under the YCbCr model.

6. The method of claim 4 wherein the method is implemented using hardware circuits that include logic gates.

7. An image processing device for converting image data from a RGB model to a Y CbCr model, wherein average down-sampling is used to convert the data, the device comprising:

control logic configured to receive a plurality of input components including a first component, a second component and a third component, wherein the plurality of input components are in a format compatible with the RGB model and each of the plurality of input components has a plurality of sub-components;

control logic configured to sum up the plurality of sub-components for each of the plurality of input components;

control logic configured to multiply the respective sums of the first component, the second component and the third component with a first set of corresponding coefficients to obtain a first set of three resulting products, said first set of corresponding coefficients being equal to −0.04219, −0.082815 and 0.12500, respectively;

control logic configured to sum up the first set of three resulting products and a constant to obtain a first output component, the first output component being a representation of the chrominance component for blueness for the YCbCr model, wherein the first output component is determined by fifteen computations, and each computation is either a multiplication or an addition computation;

control logic configured to multiply the respective sums of the first component, the second component, and the third component with a second set of corresponding coefficients to obtain a second set of three resulting products, the second set of corresponding coefficients being equal to 0.12500, −0.10467 and −0.02033, respectively; and control logic configured to sum up the second set of three resulting products and the constant to obtain a second output component, the second output component being a representation of the chrominance component for redness for the YCbCr model, wherein the second component is determined by six computations, and each computation is either a multiplication or an addition computation.

8. The device of claim 7 wherein the steps recited in claim 1 are performed on every pixel of at least a portion of an RGB image.

9. The device of claim 7 wherein the device is implemented using hardware circuits that include logic gates.

10. A computer-implemented method for converting image data from a RGB model to a YCbCr model, wherein average down-sampling is used to convert the data, the method comprising: accumulating respective sums for a first input component, a second input component and a third input component, the first, second and third input components being in a format compatible with the RGB model;

multiplying the respective sums for the first, second and third components with a first set of corresponding coefficients that are equal to −0.04219, −0.082815 and 0.12500, respectively, to obtain a first set of three resulting products;

summing up the first set of three resulting products to obtain a first sub-total sum;

multiplying the respective sums for the first, second and third components with a second set of corresponding coefficients that are equal to 0.12500, −0.10467 and −0.02033, respective, to obtain a second set of three resulting products;

summing up the second set of three resulting product to obtain a second sub-total sum;

adding a constant to the first sub-total sum to obtain a first down-sampled component, wherein the first down-sampled component is determined by fifteen computations, and each computation is either a multiplication or an addition computation;

adding the constant to the second sub-total sum to obtain a second down-sampled component, wherein the second down-sampled component is determined by six computations, and each computation is either a multiplication or an addition computation, and wherein a microprocessor for image processing is configured to perform the steps of multiplying the respective sums for the first, second and third components with a first set of corresponding coefficients, summing up the first set of three resulting products, multiplying the respective sums for the first, second and third components with a second set of corresponding coefficients, summing up the second set of three resulting products, adding the constant to the first sub-total sum, and adding the constant to the second sub-total sum.

11. The method of claim 10 wherein the first down-sampled component represents a chrominance component for blueness under the YCbCr model and the second down-sampled component represents a chrominance component for redness under the YCbCr model.

12. The method of claim 10 wherein the method is implemented using hardware circuits that include logic gates.

13. An image processing device for converting image data from a RGB model to a YCbCr model, wherein average down-sampling is used to convert the data, the method comprising:
control logic configured to accumulate respective sums for a first input component, a second input component and a third input component, the first, second and third input components being in a format compatible with the RGB model;
control logic configured to multiply the respective sums for the first, second and third components by coefficients equal to −0.04219, −0.082815 and 0.12500, respectively, to obtain a first set of three resulting products;
control logic configured to sum up the first set of three resulting products to obtain a first sub-total sum;
control logic configured to multiply the respective sums for the first, second and third components by coefficients equal to 0.12500, −0.10467 and −0.02033, respectively, to obtain a second set of three resulting products;
control logic configured to sum up the second set of three resulting product to obtain a second sub-total sum;
control logic configured to add a constant to the first sub-total sum to obtain a first down-sampled component representing a chrominance component for blueness, wherein the first down-sampled component is determined by fifteen computations, and each computation is either a multiplication or an addition computation; and
control logic configured to add the constant to the second sub-total sum to obtain a second down-sampled component representing a chrominance component for redness, wherein the second down-sampled component is determined by six computations, and each computation is either a multiplication or an addition computation.

14. The device of claim 13 wherein the first down-sampled component represents a chrominance component for blueness under the YCbCr model and the second down-sampled component represents a chrominance component for redness under the YCbCr model.

15. The device of claim 13 wherein the device is implemented using hardware circuits that include logic gates.

16. A computer-implemented method for converting image data from a RGB model to a YCbCr model, wherein average down-sampling and a down-sampling rate of "4:2:0" are used, the method comprising:
performing the following steps for each group of four pixels using an image processing microprocessor or codec, each pixel being represented by a first component, a second component and a third component, the first, second and third components being in a format compatible with the RGB model:
summing up the respective first components of all four pixels to obtain a first component sum;
summing up the respective second components of all four pixels to obtain a second component sum;
summing up the respective third components of all four pixels to obtain a third component sum;
multiplying the first, second and third component sums by coefficients equal to −0.04219, −0.082815 and 0.12500, respectively, to obtain a first set of three products;
summing up the first set of three products and a constant to obtain a first output component, the first output component being in a format compatible with the YCbCr model, wherein the first output component is determined by fifteen computations, and each computation is either a multiplication or an addition computation;
multiplying the first, second and third component sums by coefficients equal to 0.12500, −0.10467 and −0.02033, respectively, to obtain a second set of three products; and
summing up the second set of three products and the constant to obtain a second output component, the second output component being in a format compatible with the YCbCr model, wherein the second output component is determined by six computations, and each computation is either a multiplication or an addition computation.

17. The method of claim 16 wherein the first output component represents a chrominance component for blueness under the YCbCr model and the second output component represents a chrominance component for redness under the YCbCr model.

18. The method of claim 16 wherein the method is implemented using software, hardware or a combination of both.

* * * * *

UNITED STATES PATENT AND TRADEMARK OFFICE
CERTIFICATE OF CORRECTION

| | |
|---|---|
| PATENT NO. | : 7,693,326 B1 |
| APPLICATION NO. | : 10/263941 |
| DATED | : April 6, 2010 |
| INVENTOR(S) | : Fa-Long Luo |

It is certified that error appears in the above-identified patent and that said Letters Patent is hereby corrected as shown below:

Column 7, line 31, please replace "$i=(0, 1, n)$ with --$i=(0, 1,...,n)$--.

Signed and Sealed this
Fifth Day of April, 2011

David J. Kappos
*Director of the United States Patent and Trademark Office*